US012663431B2

(12) United States Patent
Chida et al.

(10) Patent No.: US 12,663,431 B2
(45) Date of Patent: Jun. 23, 2026

(54) SAMPLE CONVEYING DEVICE AND METHOD WITH SPEED ABNORMALITY DETECTION

(71) Applicant: HITACHI HIGH-TECH CORPORATION, Tokyo (JP)

(72) Inventors: Saori Chida, Tokyo (JP); Shigeru Yano, Tokyo (JP); Takeshi Tamakoshi, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 514 days.

(21) Appl. No.: 18/266,929

(22) PCT Filed: Nov. 10, 2021

(86) PCT No.: PCT/JP2021/041294
§ 371 (c)(1),
(2) Date: Jun. 13, 2023

(87) PCT Pub. No.: WO2022/137857
PCT Pub. Date: Jun. 30, 2022

(65) Prior Publication Data
US 2024/0103029 A1     Mar. 28, 2024

(30) Foreign Application Priority Data

Dec. 23, 2020    (JP) ................................. 2020-213484

(51) Int. Cl.
G01N 35/04        (2006.01)
B65G 54/02        (2006.01)
G01N 35/00        (2006.01)
(52) U.S. Cl.
CPC ............. G01N 35/04 (2013.01); B65G 54/02 (2013.01); B65G 2201/0261 (2013.01);
(Continued)

(58) Field of Classification Search
CPC .............. B01L 9/06; B65G 2201/0261; B65G 2203/0233; B65G 2203/025;
(Continued)

(56) References Cited

U.S. PATENT DOCUMENTS

| | | | |
|---|---|---|---|
| 2012/0048682 A1 | 3/2012 | Itoh et al. | |
| 2013/0034410 A1* | 2/2013 | Heise ..................... | G01N 35/04 |
| | | | 414/222.13 |

(Continued)

FOREIGN PATENT DOCUMENTS

| | | |
|---|---|---|
| CN | 103177992 A | 6/2013 |
| CN | 109196363 A | 1/2019 |

(Continued)

OTHER PUBLICATIONS

International Preliminary Report on Patentability received in corresponding International Application No. PCT/JP2021/041294 dated Jul. 6, 2023.

(Continued)

*Primary Examiner* — David L Singer
(74) *Attorney, Agent, or Firm* — MATTINGLY & MALUR, PC

(57) ABSTRACT
A sample conveying device and a sample conveyance method capable of determining a cause of an abnormality in a conveyance speed more quickly than in the related art. In a conveying device, a general conveyance speed of a conveying container is obtained from a position of the conveying container detected by a position detection unit to determine whether the general conveyance speed is abnormal, and upon determining that the general conveyance speed is abnormal, an inspection conveying container is conveyed, and the cause of the abnormality in the general conveyance speed is determined based on the conveyance speed of the inspection conveying container.

9 Claims, 8 Drawing Sheets

(52) U.S. Cl.
CPC ................ *B65G 2203/0233* (2013.01); *B65G 2203/025* (2013.01); *B65G 2203/043* (2013.01); *G01N 2035/00643* (2013.01); *G01N 2035/00891* (2013.01); *G01N 2035/0406* (2013.01); *G01N 2035/0477* (2013.01); *G01N 2035/0491* (2013.01)

(58) Field of Classification Search
CPC .. B65G 2203/043; B65G 43/00; B65G 43/08; B65G 54/02; G01N 2035/00643; G01N 2035/00891; G01N 2035/0406; G01N 2035/0475; G01N 2035/0477; G01N 2035/0491; G01N 2035/0494; G01N 35/00584; G01N 35/04; G01P 3/52; H01F 7/206

See application file for complete search history.

(56) References Cited

U.S. PATENT DOCUMENTS

| | | | |
|---|---|---|---|
| 2013/0166064 A1 | 6/2013 | Maki et al. | |
| 2014/0231217 A1 | 8/2014 | Denninger et al. | |
| 2014/0234065 A1* | 8/2014 | Heise | B65G 54/02 414/749.2 |
| 2014/0234978 A1* | 8/2014 | Heise | G01N 35/04 422/65 |
| 2015/0233957 A1* | 8/2015 | Riether | B01L 9/06 422/562 |
| 2015/0276776 A1* | 10/2015 | Riether | B65G 54/02 422/63 |
| 2015/0276777 A1* | 10/2015 | Riether | G01N 35/10 700/230 |
| 2015/0276781 A1* | 10/2015 | Riether | G01N 27/24 700/230 |
| 2015/0276782 A1* | 10/2015 | Riether | G01N 35/04 700/230 |
| 2015/0360876 A1* | 12/2015 | Sinz | B65G 54/02 198/619 |
| 2016/0054341 A1* | 2/2016 | Edelmann | G01N 35/04 198/619 |
| 2016/0069715 A1* | 3/2016 | Sinz | G01N 35/00 324/202 |
| 2016/0077120 A1* | 3/2016 | Riether | G01N 35/04 422/65 |
| 2016/0097786 A1* | 4/2016 | Malinowski | G01N 35/00 422/67 |

| | | | |
|---|---|---|---|
| 2016/0274137 A1* | 9/2016 | Baer | B65G 54/02 |
| 2016/0282378 A1* | 9/2016 | Malinowski | G01N 35/04 |
| 2016/0341750 A1* | 11/2016 | Sinz | G01N 35/026 |
| 2016/0341751 A1* | 11/2016 | Huber | G01N 35/00584 |
| 2017/0096307 A1* | 4/2017 | Mahmudimanesh | B65G 43/00 |
| 2017/0101277 A1* | 4/2017 | Malinowski | B65G 54/02 |
| 2017/0108522 A1* | 4/2017 | Baer | B65G 54/02 |
| 2017/0131309 A1* | 5/2017 | Pedain | B65G 54/02 |
| 2017/0131310 A1* | 5/2017 | Volz | G01N 35/04 |
| 2017/0160299 A1* | 6/2017 | Schneider | H01F 5/04 |
| 2017/0168079 A1* | 6/2017 | Sinz | B01L 9/06 |
| 2017/0174448 A1* | 6/2017 | Sinz | B01L 9/06 |
| 2017/0184622 A1* | 6/2017 | Sinz | G01N 35/04 |
| 2017/0363608 A1* | 12/2017 | Sinz | G01N 35/04 |
| 2018/0067141 A1* | 3/2018 | Mahmudimanesh | G01N 35/04 |
| 2018/0106821 A1* | 4/2018 | Vollenweider | G01N 35/04 |
| 2018/0128848 A1* | 5/2018 | Schneider | G01N 35/04 |
| 2018/0156835 A1* | 6/2018 | Hassan | G01N 35/1081 |
| 2018/0188280 A1* | 7/2018 | Malinowski | H01F 7/0205 |
| 2018/0210000 A1* | 7/2018 | van Mierlo | G01N 35/04 |
| 2018/0210001 A1* | 7/2018 | Reza | B01L 9/06 |
| 2018/0217174 A1* | 8/2018 | Malinowski | G01R 19/2513 |
| 2018/0217176 A1* | 8/2018 | Sinz | G01N 35/04 |
| 2018/0224476 A1* | 8/2018 | Birrer | G01N 35/04 |
| 2018/0340951 A1* | 11/2018 | Kaeppeli | B65G 54/02 |
| 2018/0348244 A1* | 12/2018 | Ren | B65G 54/02 |
| 2019/0018027 A1* | 1/2019 | Hoehnel | G01N 35/00722 |
| 2019/0076845 A1* | 3/2019 | Huber | B65G 54/025 |
| 2019/0076846 A1* | 3/2019 | Durco | B01L 9/06 |
| 2019/0086433 A1 | 3/2019 | Hermann et al. | |
| 2019/0154717 A1* | 5/2019 | Sinz | B01L 3/502715 |
| 2020/0400698 A1 | 12/2020 | Hafner et al. | |
| 2023/0093550 A1* | 3/2023 | Oosterbroek | G01N 35/00623 422/67 |

FOREIGN PATENT DOCUMENTS

| | | |
|---|---|---|
| JP | 07-228346 A | 8/1995 |
| JP | 08-98326 A | 4/1996 |
| JP | 2015-502525 A | 1/2015 |
| WO | 2019-170488 A1 | 9/2019 |

OTHER PUBLICATIONS

Chinese Office Action received in corresponding Chinese Application No. 202180085085.6 dated Sep. 20, 2025.
International Search Report of PCT/JP2021/041294 dated Feb. 1, 2022.

* cited by examiner

[FIG. 1]
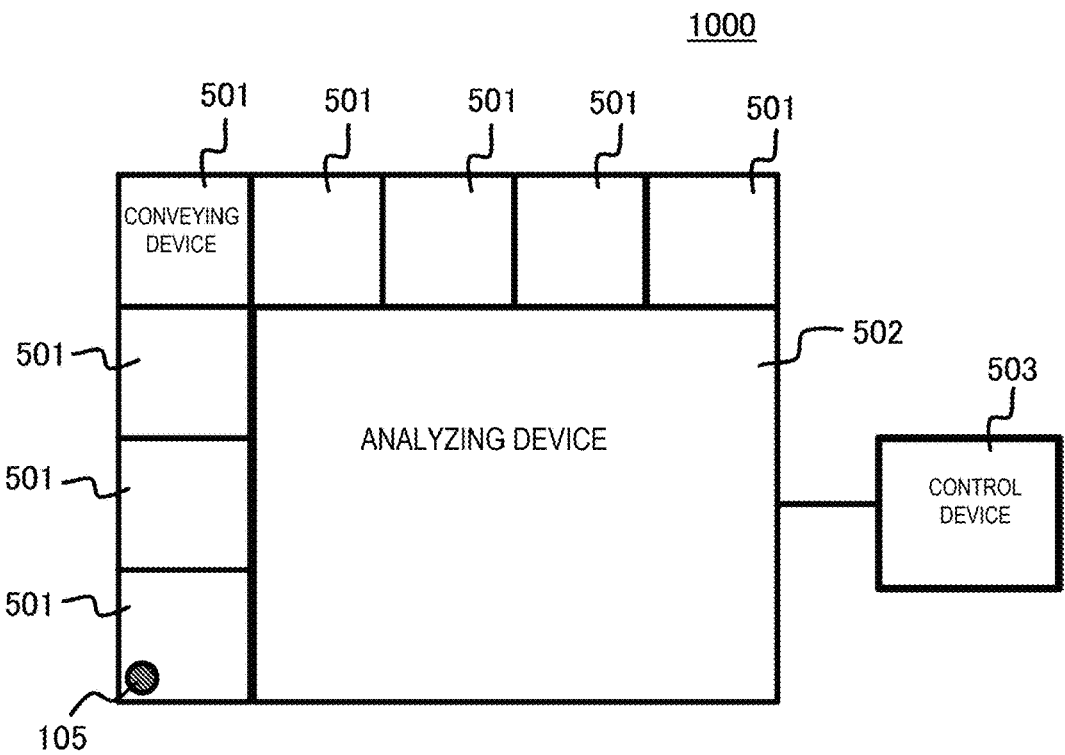
[FIG. 2]
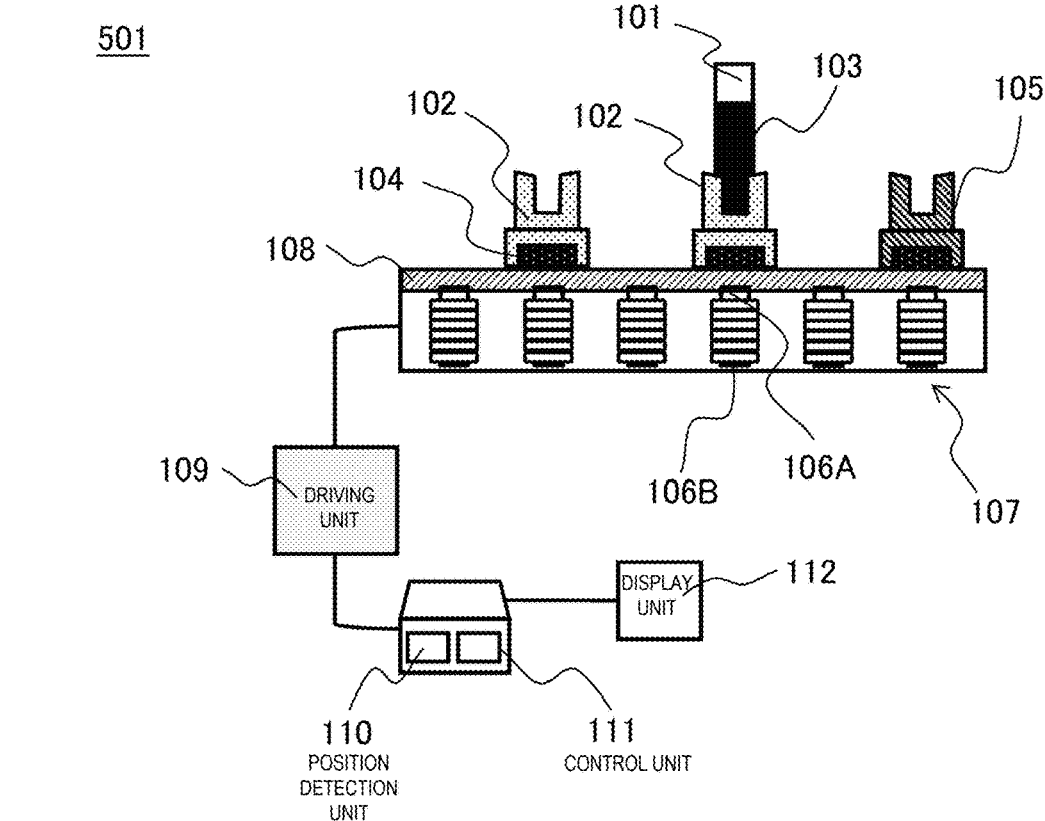

[FIG. 3]
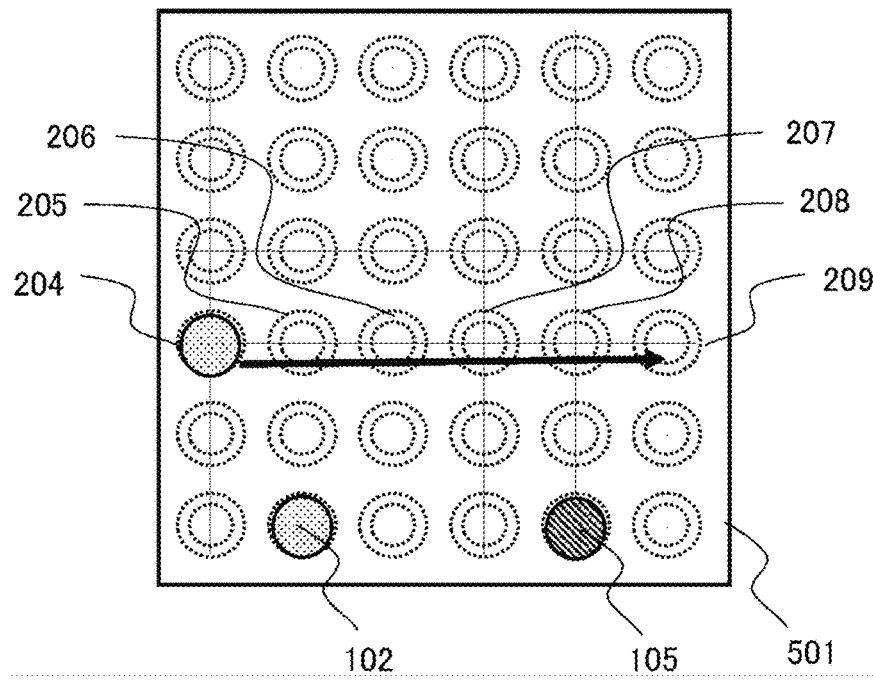
[FIG. 4]
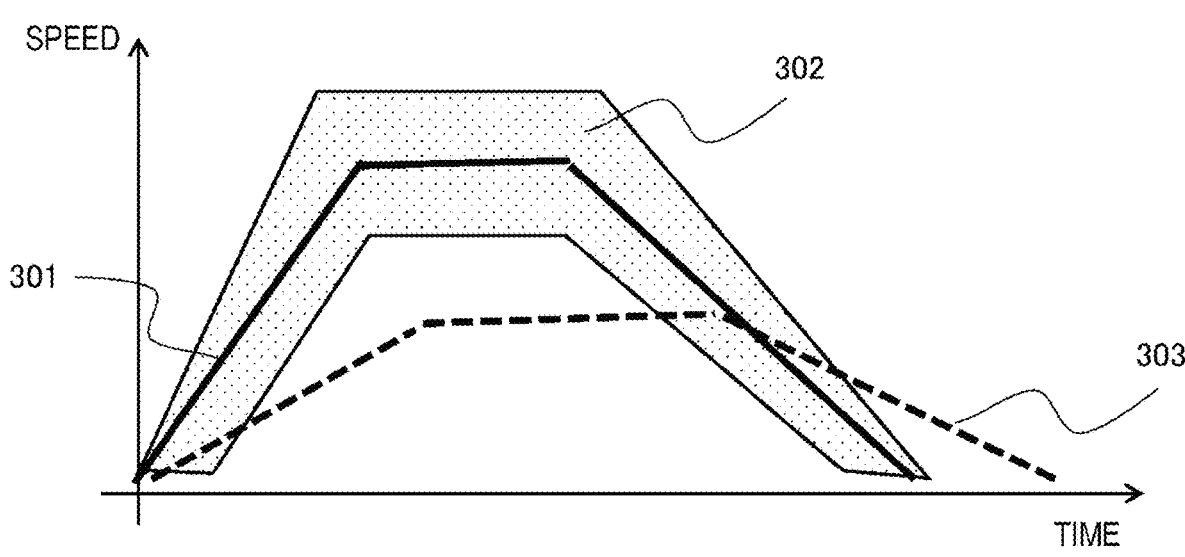
CHANGE IN A CONVEYANCE SPEED OF A GENERAL CONVEYING CONTAINER

[FIG. 5]
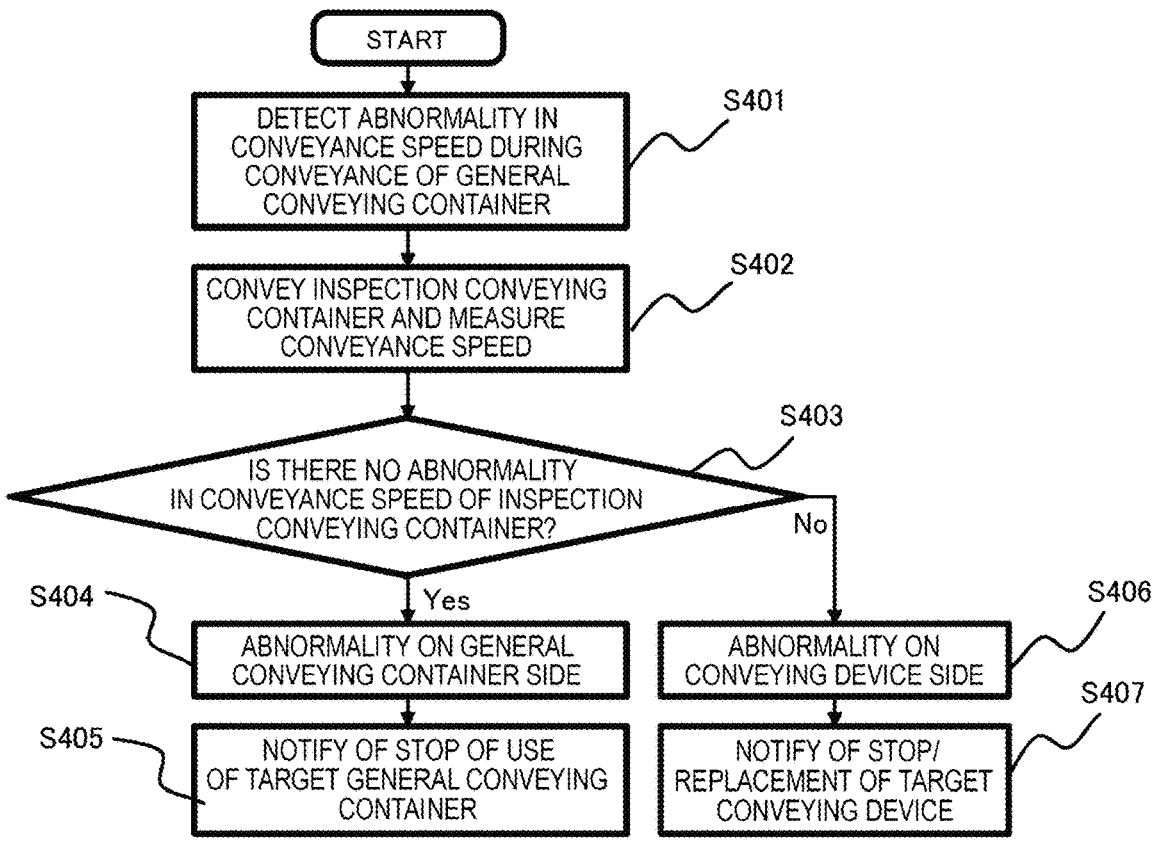
[FIG. 6]
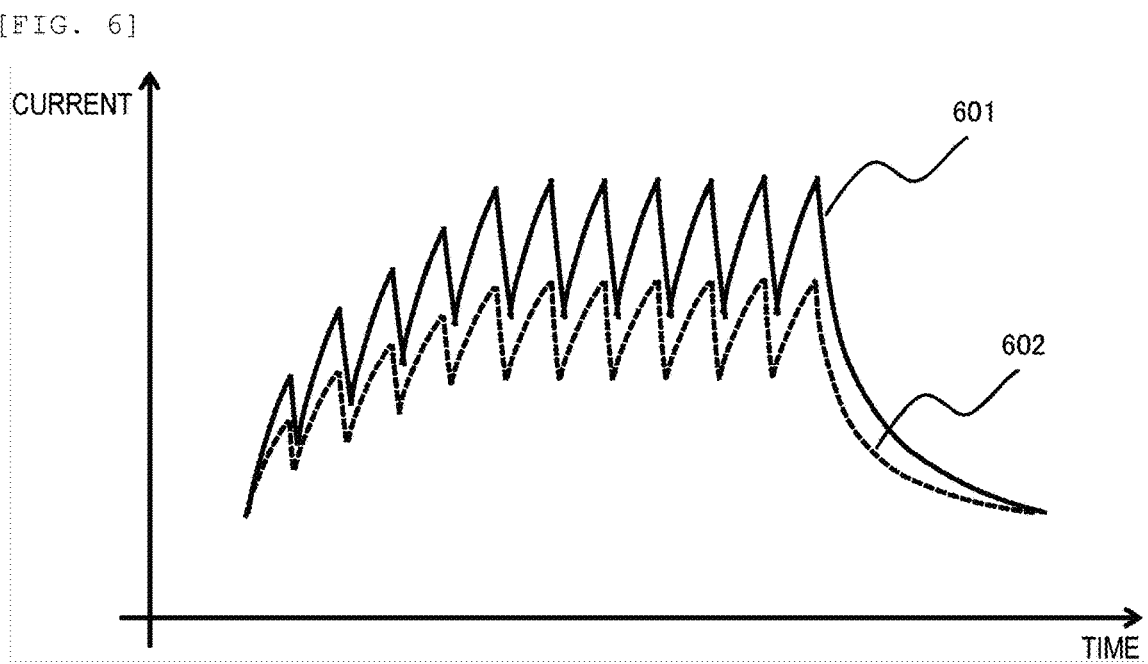
CURRENT FLOWING THROUGH A MAGNETIC POLE WHEN CONVEYING A CONVEYING CONTAINER
ACCORDING TO EMBODIMENT 2

[FIG. 7]
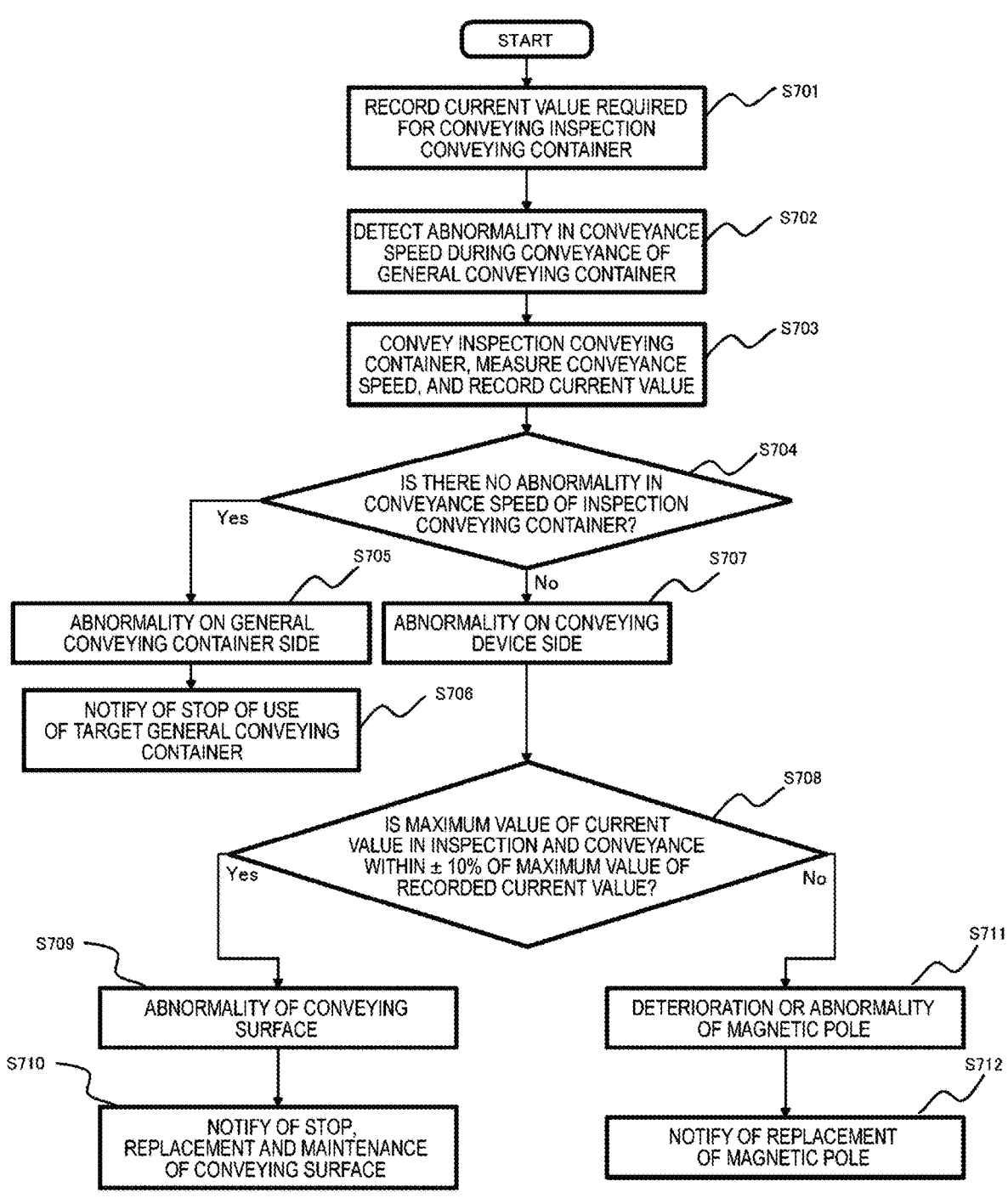

[FIG. 8]
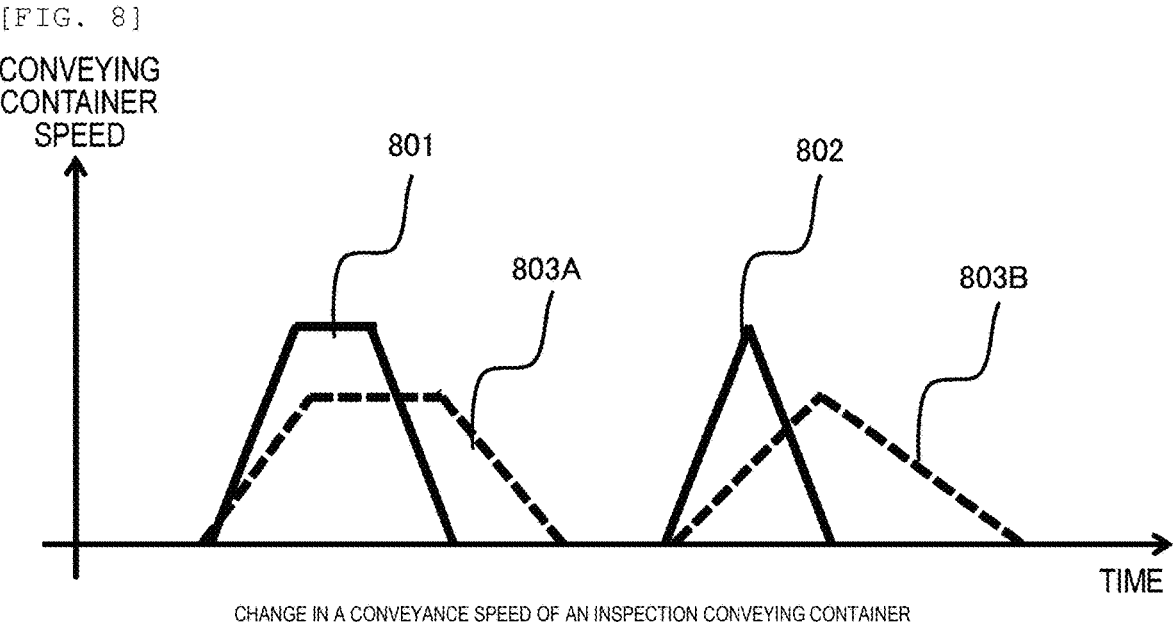
CHANGE IN A CONVEYANCE SPEED OF AN INSPECTION CONVEYING CONTAINER
ACCORDING TO EMBODIMENT 3
[FIG. 9]
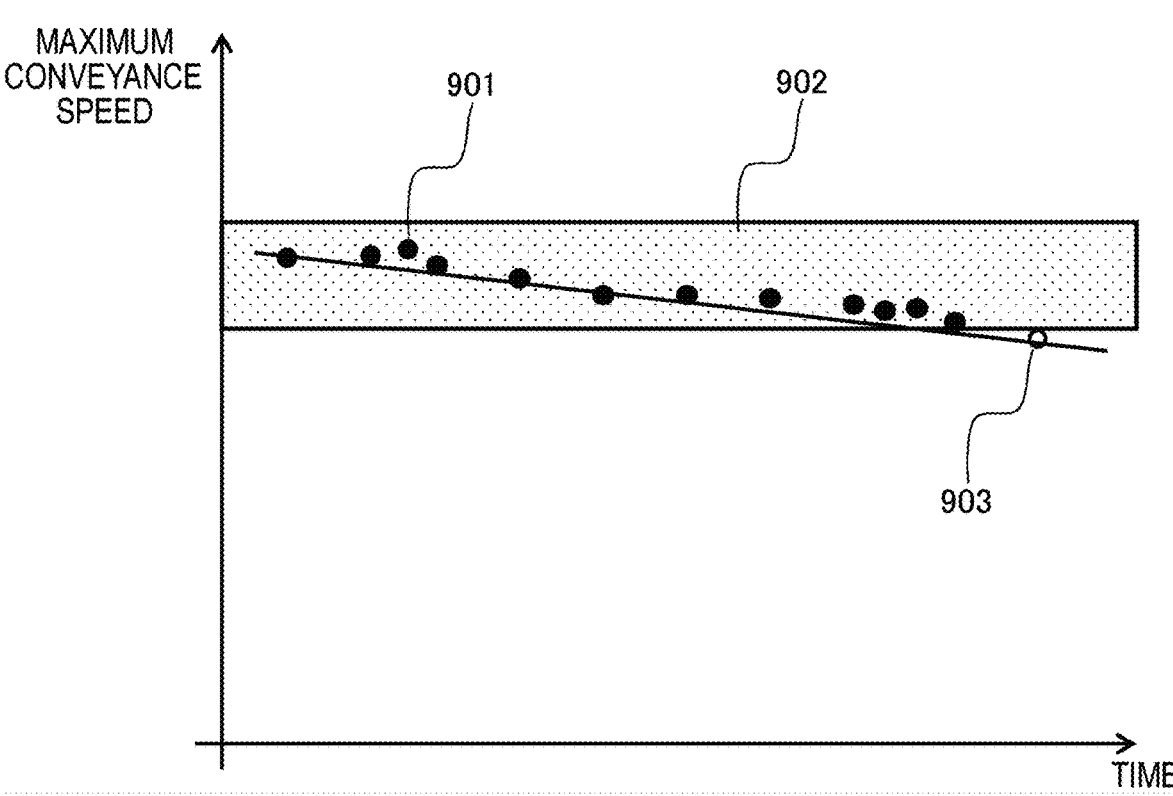
MAXIMUM CONVEYANCE SPEED OF THE INSPECTION CONVEYING CONTAINER ACCORDING TO EMBODIMENT 3
WHEN DETERIORATION OF CONVEYING SURFACE IS SUSPECTED

[FIG. 10]
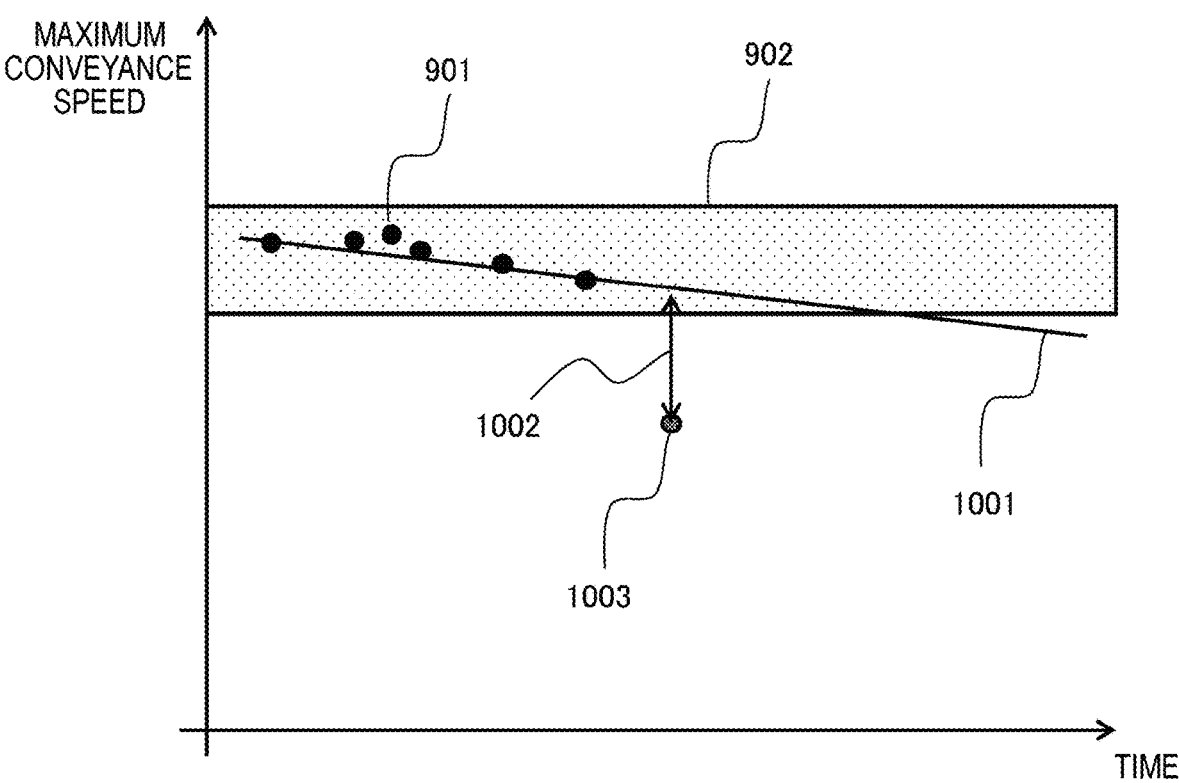
MAXIMUM CONVEYANCE SPEED OF THE INSPECTION CONVEYING CONTAINER IN THE SAMPLE CONVEYING
DEVICE ACCORDING TO EMBODIMENT 3 WHEN DIRT ON CONVEYING SURFACE IS SUSPECTED

[FIG. 11]
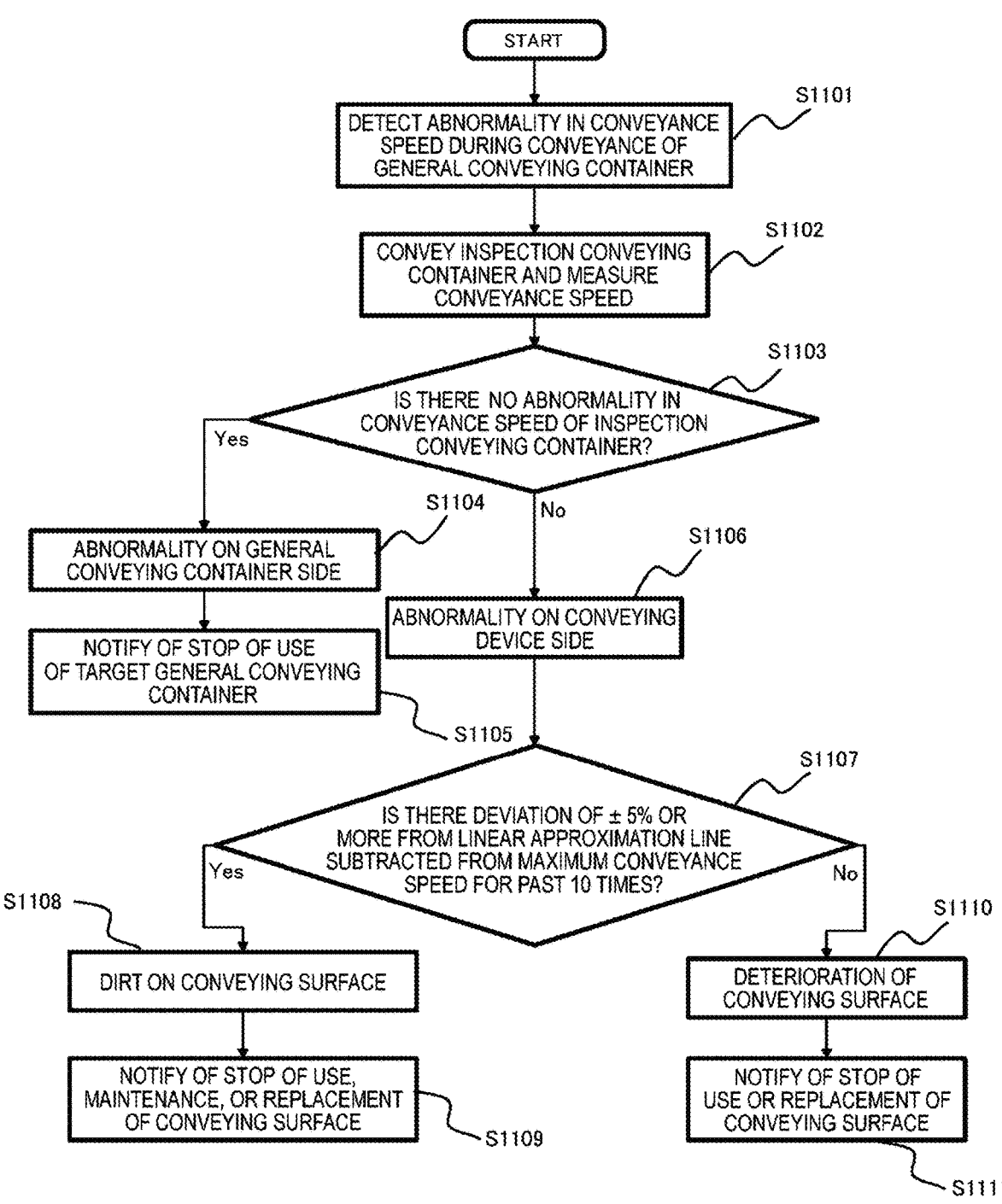

[FIG. 12]
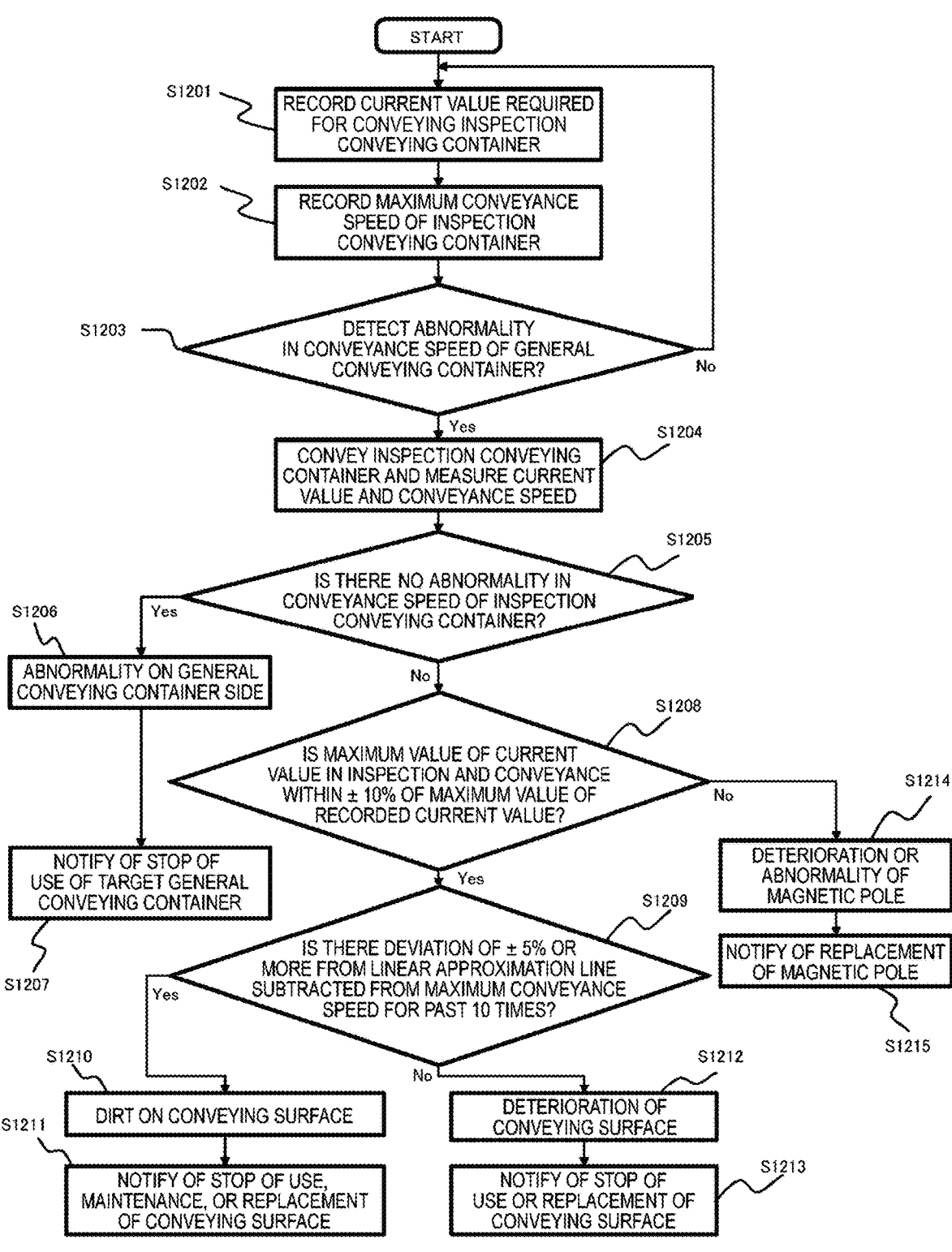

SAMPLE CONVEYING DEVICE AND METHOD WITH SPEED ABNORMALITY DETECTION

TECHNICAL FIELD

The invention relates to a sample conveying device and a sample conveyance method in a sample test automation system.

BACKGROUND ART

As an example of a laboratory sample distribution system, PTL 1 describes a laboratory sample distribution system including: several container carriers each including at least one magnetically active device, preferably at least one permanent magnet, and adapted to carry a sample container containing a sample; and a conveying device. The conveying device includes: a conveying surface adapted to carry a plurality of container carriers; several electromagnetic actuators each stationary provided below the conveying surface and adapted to move a container carrier placed on top of the conveying surface by applying a magnetic force to the container carrier; and a control device adapted to control the movement of the container carriers on top of the conveying surface by driving the electromagnetic actuators, and adapted to control the movement such that three or more container carriers are movable simultaneously and independently from one another.

CITATION LIST

Patent Literature

PTL 1: JP2015-502525A

SUMMARY OF INVENTION

Technical Problem

A sample test automation system for clinical tests tests a sample such as blood, plasma, serum, urine, and other body fluids. Since a diagnosis of a doctor and a treatment plan are determined based on a result of the sample test, in order to rapidly perform the sample test, there is a demand for a sample conveying device having characteristics such as an improvement in conveyance speed of a sample, a large amount of conveyance, a small stop, and a possibility of immediately solving an error.

As described in PTL 1, a sample conveying device in the related art has a function of detecting an abnormality in sample conveyance. In PTL 1 described above, by comparing a schedule position and a detected position, for example, a gradual decrease in the conveyance speed caused by, for example, dirt on the conveying surface that causes an increase in friction is detected. In addition, when the gradual decrease is determined, a control device displays an error message when a magnetic force generated by the electromagnetic actuator is increased and/or the conveyance speed is lower than a given threshold value.

However, in the sample conveying device in the related art, there is a need to mount a large number of various types of sensors in order to detect an abnormality related to conveyance of a sample.

In particular, when an abnormality in a conveyance speed of a conveying container on which the sample container is mounted is detected, a function of notifying an operator of the abnormality as an error message is also possessed. However, a cause of the abnormality in the conveyance speed cannot be determined, it is necessary for the operator or a maintenance operator to identify a cause of a problem, and it takes time to solve the problem.

Since the sample conveying device in an examination room in a hospital is required to have a quick response to the enlargement of a pre-medical examination and stability due to the widespread use of a 24-hour operation, a technique for identifying the cause of the abnormality more quickly has been expected.

The invention has been made in order to solve the above-described problem in the related art, and provides a sample conveying device and a sample conveyance method that are capable of determining a cause of an abnormality in a conveyance speed more quickly than that in the related art.

Solution to Problem

The invention has a plurality of means for solving the above-described problem, and as an example thereof, a sample conveying device includes: a conveying surface that conveys a conveying container provided with a magnetic material thereon; a position detection unit that obtains a position of the conveying container on the conveying surface; a plurality of magnetic poles that are disposed below the conveying surface and provided with cores and coils; a driving unit that applies a voltage to the magnetic poles; and a control unit that controls the driving unit. The control unit obtains a general conveyance speed of the conveying container from the position of the conveying container detected by the position detection unit to determine whether the general conveyance speed is abnormal, and when it is determined that the general conveyance speed is abnormal, conveys a reference conveying container and determines a cause of an abnormality in the general conveyance speed based on a conveyance speed of the reference conveying container.

Advantageous Effects of Invention

According to the invention, a cause of an abnormality in a conveyance speed can be determined more quickly than that in the related art. Objects, configurations, and effects other than those described above will be clarified by the description of the following embodiments.

BRIEF DESCRIPTION OF DRAWINGS

FIG. 1 is a plan view illustrating a schematic configuration of an entire sample test automation system including a sample conveying device according to Embodiment 1 of the invention.

FIG. 2 is a side view of the sample conveying device according to Embodiment 1.

FIG. 3 is an overhead view of the sample conveying device according to Embodiment 1.

FIG. 4 is an example illustrating a change in a conveyance speed of a general conveying container.

FIG. 5 is a flowchart for determining a cause of an abnormality in a conveyance speed of the conveying container in the sample conveying device according to Embodiment 1.

FIG. 6 is an example illustrating a current flowing through a magnetic pole when conveying a conveying container in a sample conveying device according to Embodiment 2 of the invention.

FIG. 7 is a flowchart for determining a cause of an abnormality in a conveyance speed of the conveying container in the sample conveying device according to Embodiment 2.

FIG. 8 is an example illustrating a change in a conveyance speed of an inspection conveying container in a sample conveying device according to Embodiment 3 of the invention.

FIG. 9 is an example in which a maximum conveyance speed of the inspection conveying container in the sample conveying device according to Embodiment 3 is plotted in chronological order.

FIG. 10 is an example in which the maximum conveyance speed of the inspection conveying container in the sample conveying device according to Embodiment 3 is plotted in chronological order.

FIG. 11 is a flowchart for determining a cause of an abnormality in a conveyance speed of a conveying container in the sample conveying device according to Embodiment 3.

FIG. 12 is a flowchart for determining a cause of an abnormality in a conveyance speed in a sample conveying device according to Embodiment 4 of the invention.

DESCRIPTION OF EMBODIMENTS

Hereinafter, embodiments of a sample conveying device and a sample conveyance method according to the invention will be described with reference to the drawings.

In the following embodiments, it is needless to say that components (including element steps and the like) are not always indispensable unless explicitly and particularly specified or unless the components are clearly considered as essential in principle. Further, in the drawings used in this description, the same or corresponding components are denoted by the same or similar reference signs, and the repeated description of these components may be omitted.

Embodiment 1

Embodiment 1 of a sample conveying device and a sample conveyance method according to the invention will be described with reference to FIGS. 1 to 5.

FIG. 1 is a plan view illustrating a schematic configuration of an entire sample test automation system including a sample conveying device according to Embodiment 1. FIG. 2 is a side view of the sample conveying device. FIG. 3 is an overhead view of the sample conveying device. FIG. 4 is an example illustrating a change in a conveyance speed of a general conveying container. FIG. 5 is a flowchart for determining whether a cause of an abnormality in a conveyance speed of a conveying container in the sample conveying device according to Embodiment 1 is on a general conveying container side or on a conveying device side.

First, a configuration of the entire sample test automation system including the sample conveying device will be described with reference to FIG. 1.

A sample test automation system 1000 according to the present embodiment illustrated in FIG. 1 is a system including analyzing devices that automatically analyzes ingredients of a sample such as blood and urine.

The sample test automation system 1000 mainly includes conveying containers 102 (see FIG. 2) on which sample containers 101 (see FIG. 2 and the like) each containing a sample are mounted, or a plurality of (eight in FIG. 1) conveying devices 501 that each convey, to a predetermined destination, an empty conveying container 102 on which the sample container 101 is not mounted, one or more (one in FIG. 1) analyzing devices 502, and a control device 503 that integrally manages the sample test automation system 1000.

The analyzing device 502 is a unit that performs a qualitative and quantitative analysis on ingredients of the sample conveyed by the conveying device 501. Analysis items in this unit are not particularly limited, and a configuration of a known automatic analyzer that analyzes a biochemical item and an immune item can be adopted. Further, a plurality of analyzing devices can be provided. Specifications in this case may be the same or different, and are not particularly limited.

Each of the conveying devices 501 is a device that conveys the sample containers 101 mounted on the conveying containers 102 and each containing the sample to a destination (such as the analyzing device 502 or a take-out port) by sliding on a conveyance path by an interaction between magnetic poles 107 (see FIG. 2) and magnetic materials 104 (see FIG. 2) provided in the conveying containers 102. Details thereof will be described in detail with reference to FIG. 2 and subsequent drawings.

The control device 503 controls an operation of the overall system including the conveying devices 501 and the analyzing devices 502, and is implemented by a computer including a display device such as a liquid crystal display, an input device, a storage device, a CPU, a memory, and the like. The control of the operation of each device by the control device 503 is executed based on various programs recorded in the storage device.

Operation control processes executed by the control device 503 may be integrated into one program, may be divided into a plurality of programs, or may be a combination thereof. A part or all of the programs may be implemented by dedicated hardware, or may be modularized.

In FIG. 1 described above, the case has been described in which one analyzing device 502 is provided, and the number of the analyzing devices is not particularly limited and may be two or more. Similarly, the number of the conveying devices 501 is not particularly limited and may be one or more.

The sample test automation system 1000 can be provided with various sample pre-processing and post-processing units that perform pre-processing and post-processing on a sample, in addition to or in place of the analyzing device 502. A detailed configuration of the sample pre-processing and post-processing unit is not particularly limited, and a configuration of a known pre-processing device can be adopted.

Next, a configuration of the conveying device 501 according to the present embodiment will be described with reference to FIG. 2.

As illustrated in FIG. 2, a plurality of conveying containers 102 on which the sample containers 101 each containing a sample are mounted are provided in the conveying device 501. The magnetic material 104 is provided on a bottom surface portion of each of the plurality of conveying containers 102.

The magnetic material 104 is formed of, for example, a permanent magnet such as neodymium or ferrite, can also be formed of other magnets and soft magnetic bodies, and can be formed of appropriate combinations thereof.

A conveying surface 108 is formed by a flat surface having a small frictional force, and as illustrated in FIG. 3, the magnetic poles 107 are arranged on a back side (below) the conveying surface 108.

The conveying container 102 including the magnetic material 104 moves in a manner of sliding on the conveying surface 108. In order to generate a conveying force of the conveying surface 108, a plurality of magnetic poles 107 each including a columnar core 106A and a coil 106B wound around an outer periphery of the core 106A are provided below the conveying surface 108.

In the conveying device 501 according to the present embodiment, the magnetic poles 107 serve to detect a position of the magnetic material 104, and serve to convey the magnetic material 104, that is, convey a sample.

The magnetic poles 107 are connected to a driving unit 109 that applies a predetermined voltage to cause a predetermined current to flow through the coil 106B. Each magnetic pole 107 to which the voltage is applied by the driving unit 109 acts as an electromagnet, and attracts the magnetic material 104 provided in the conveying container 102 on the conveying surface 108. After the conveying container 102 is attracted by the magnetic pole 107, the voltage application to the magnetic pole 107 by the driving unit 109 is stopped, and a voltage is applied to a different magnetic pole 107 adjacent to the magnetic pole 107 by the driving unit 109 in the same manner as described above, so that the magnetic material 104 provided in the conveying container 102 is attracted to the adjacent magnetic pole 107. A driving force to be generated is not limited to an attraction force, and may be a repulsive force.

For example, consider a case in which, as illustrated in FIG. 3, the magnetic poles are arranged at 6×6 positions, that is, stop positions of the conveying container 102 are 6×6 positions, and the conveying container 102 is desired to be moved from a position A 204 to a position F 209.

In such a case, a voltage is applied to the magnetic pole 107 at a position B 205 to attract the conveying container 102 at the position A 204. When a position detection unit 110 detects that the conveying container 102 arrives at the position B 205, a voltage is applied to the magnetic pole 107 at a position C 206, which is a traveling direction, and the conveying container 102 at the position B 205 is attracted.

When the position detection unit 110 detects that the conveying container 102 arrives at the position C 206, a voltage is applied to the magnetic pole 107 at a position D 207, which is a traveling direction, and the conveying container 102 at the position C 206 is attracted. When the position detection unit 110 detects that the conveying container 102 arrives at the position D 207, a voltage is applied to the magnetic pole 107 at a position E 208, which is a traveling direction, and the conveying container 102 at the position D 207 is attracted.

When the position detection unit 110 detects that the conveying container 102 arrives at the position E 208, a voltage is applied to the magnetic pole 107 at the position F 209, which is a traveling direction, and the conveying container 102 at the position E 208 is attracted and conveyed in a manner of sliding to the position F 209, which is a destination.

By repeating this procedure on all the magnetic poles 107 of the plurality of conveying devices 501 constituting a conveyance path, the sample that is contained in the sample container 101 held in the conveying container 102 provided with the magnetic material 104 is conveyed to a destination in the sample test automation system 1000.

The control unit 111 uses various types of information such as position information, speed information, and weight information of the conveying container 102 to calculate a current flowing through each of the coils 106B, and outputs a command signal to each of the driving units 109. The driving unit 109 applies a voltage to the corresponding coil 106B based on the command signal.

During the conveyance of the sample container 101, the control unit 111 according to the present embodiment obtains a general conveyance speed of the conveying container 102 from a position of the conveying container 102 detected by the position detection unit 110 to determine whether the general conveyance speed is abnormal. When it is determined that the general conveyance speed is abnormal, the control unit 111 conveys an inspection conveying container 105 (details thereof will be described later) and determines a cause of an abnormality in the general conveyance speed based on a conveyance speed of the inspection conveying container 105. The details of this control will be described later.

The control unit 111 executes an abnormality determination step, a reference conveyance step, and a determination step.

The control unit 111 and a display unit 112 to be described later are provided in the control device 503 to be described later, and can be provided in the conveying device 501. In the case in which the position detection unit 110 to be described later detects a current flowing through the coil 106B of the magnetic pole 107 and how the current flows to obtain the position of the magnetic material 104, the position detection unit 110 can also be formed in the control device 503.

A configuration of the position detection unit 110 is not particularly limited as long as the position detection unit 110 can detect the position of the conveying container 102 on the conveying surface 108. For example, the position detection unit 110 can be implemented as a Hall sensor that detects a magnetic flux of the magnetic material 104 of the sample container 101, a length measuring device, or the like to directly detect the position of the sample container 101. Further, the position of the sample container 101 can be obtained indirectly by detecting the current flowing through the coil 106B of the magnetic pole 107 and the how the current flows and obtaining the position of the magnetic material 104. The position detection unit 110 executes a position detection step of obtaining the position of the conveying container 102 on the conveying surface 108.

The display unit 112 is a unit for notifying an operator of various types of information, and for example, a display device such as a liquid crystal display provided in the above-described control device 503 is preferably used. Instead of or in addition to the display device, an acoustic device such as an alarm device may be used.

Next, a characteristic control of the conveying device 501 according to the present embodiment will be described in detail with reference to FIG. 4 and subsequent drawings.

A weight of a sample 103, which is a conveyance object to be conveyed by the conveying container 102, is not constant. There are various situations in which, for example, the conveyance object may be a cup into which 1 mL of the sample can be dispensed or a test tube in which a rubber plug capable of dispensing 10 mL of the sample is provided, or nothing is mounted.

A magnitude of the frictional force is a product of a mass m of the object, a magnitude g of gravitational acceleration, and a friction coefficient.

In a case in which the conveying container 102 is conveyed, when the same voltage is applied assuming that masses of the conveying containers 102 in the sample test automation system 1000 and the conveying device 501 are all constant, the frictional force increases as a mass of the conveyance object increases, and the conveyance speed decreases. That is, a decrease in a conveyance speed of the conveying container 102 due to the large mass of the conveyance object is not abnormal.

However, all of the causes of the decrease in the conveyance speed are not derived from the increase in the mass of the conveyance object. For example, the deterioration of the magnetic pole 107, the deterioration of the conveying surface 108 or dirt on the conveying surface 108, and a change in a state of a bottom surface of the conveying container 102 may be considered.

In order to determine these causes of the abnormality in the conveyance speed, a reference conveying container is provided. The reference conveying container is referred to as the inspection conveying container 105. As a comparison, the conveying container 102 that conveys a sample such as the sample 103 for sample test is referred to as a general conveying container.

A feature of the inspection conveying container 105 is that, as compared with a general conveying container 102, the inspection conveying container 105 is managed without changing a state as a conveying container as much as possible.

For example, it is desirable that a state of a bottom surface of the inspection conveying container 105 is managed. The bottom surface of the conveying container 102 and an upper surface of the conveying surface 108 are constantly in contact with each other, and due to this structure, the bottom surface of the conveying container 102 or the upper surface of the conveying surface 108 is scraped or scratched due to friction, and a state of a contact surface changes.

Since the inspection conveying container 105 is a reference conveying container, it is desirable that the inspection conveying container 105 is as new as possible and is not scraped or scratched. In addition, it is desirable to store a conveyance distance.

When the inspection conveying container 105 is a conveying container on which no conveyance object is mounted, the general conveying container 102 with a cumulative conveyance distance less than a threshold value can also be used as an inspection conveying container.

In addition, when a cumulative conveyance distance of the inspection conveying container 105 is equal to or greater than the threshold value, it is desirable that the control unit 111 notifies, via the display unit 112, the operator to take measures such as stop of use of the inspection conveying container 105.

When the general conveying container 102 is used as the inspection conveying container 105, it is desirable that a conveying container in which a state of the magnetic material 104 of the conveying container is unknown, or the general conveying container 102 whose use frequency or conveyed distance is unknown and the state of the bottom surface is unknown is not used as the inspection conveying container 105.

It is desirable that conveyance conditions of the inspection conveying container 105 are the same as conveyance conditions of the conveying container 102 when an abnormality is detected.

For example, a mass of the inspection conveying container 105 is not changed as much as possible. Since the conveyance objects of the general conveying container 102 vary in mass, conveyance speeds and current values necessary for conveyance are different. In order to ignore factors such as mass as a cause of an abnormality in the conveyance speed, it is desirable that the mass of the inspection conveying container 105 is as constant as possible.

That is, in the conveyance of the inspection conveying container 105 when an abnormality in the speed is detected in the general conveying container 102 on which any conveyance object is placed, it is desired that conveyance objects having the same weight are placed, and when an abnormality in the speed is detected in the general conveying container 102 on which no conveyance object is placed, it is desired that the inspection conveying container 105 is conveyed for inspection without placing anything on the inspection conveying container 105 at the time of conveyance of the inspection conveying container 105.

A method for storing the inspection conveying container 105 described above is not particularly limited. For example, the inspection conveying container 105 is put on standby at a position of the conveying device 501 where there is no influence on conveyance as illustrated in FIG. 1, or the inspection conveying container 105 is provided on the conveying surface 108 of the conveying device 501 by notifying, via the display unit 112, the operator that conveyance for inspection is required when the inspection conveyance is required.

FIG. 4 is an example illustrating a change in the conveyance speed of the general conveying container. For example, when a conveyance speed at the time when a general conveying container having no particular problem is conveyed from the position A 204 to the position F 209 is indicated by a solid line 301, an area 302 taken with a certain threshold value from the solid line 301 is set as a threshold value (first set reference range) used for determining that the conveying container is normally conveyed.

When the general conveying container 102 having no problem is conveyed from the position A 204 to the position F 209, the general conveying container 102 operates near the solid line 301 and is conveyed within the area 302.

On the other hand, since a conveyance speed at the time when the general conveying container 102 having an abnormality is similarly conveyed from the position A 204 to the position F 209 deviates from the area 302 as indicated by a solid line 303, in such a case, the control unit 111 that manages the conveyance speed determines that the conveyance speed is abnormal. The inspection conveying container 105 is conveyed, and a cause of an abnormality in the general conveyance speed is determined based on the conveyance speed of the inspection conveying container 105.

At this time, when the conveyance speed of the inspection conveying container 105 satisfies the area 302 which is the first set reference range, the control unit 111 notifies, via the display unit 112, the operator of stop of use of the general conveying container 102 for which an abnormality is detected, and when the conveyance speed of the inspection conveying container 105 does not satisfy the area 302, the control unit 111 determines that the conveying surface 108 on a conveying device 501 side or a magnetic pole 107 side is abnormal, and notifies the operator of replacement or inspection of the conveying device 501 via the display unit 112.

In the area 302, an initial value is set in advance for each conveyance distance of the conveying container, and a service person or the operator can change the threshold value.

It is desirable that the above-described conveyance (hereinafter, referred to as conveyance for inspection) of the inspection conveying container 105 is performed at an appropriate frequency so as to detect an abnormality in conveyance of the general conveying container 102.

For example, when the conveying device 501 or the sample test automation system 1000 is started, a specific conveying container is registered as the inspection conveying container 105. Immediately after the registration, the inspection conveying container 105 is conveyed in a manner of passing through all the conveyance paths. At this time, a current required for conveyance or the conveyance speed of the inspection conveying container 105 is registered as an initial value. After the registration, the inspection conveying container 105 is conveyed for inspection according to an instruction from the operator.

The conveyance path of the inspection conveying container 105 at the time of the conveyance for inspection does not need to be the same every time, and it is desirable to convey the inspection conveying container 105 via all conveyance positions of all the conveying devices 501.

When an abnormality in the speed of the general conveying container 102 is detected, it is desirable that the conveyance path is limited to pass through the conveying device 501 for which an abnormality in the conveyance speed is detected in the general conveying container 102, and the conveyance path is set to follow the conveyance path of the general conveying container 102.

Furthermore, it is desirable that the inspection conveying container 105 is periodically conveyed for inspection. "Periodically" may be every set hour or every set number of days. When the number of times the conveying container is conveyed to a certain position exceeds a specified number, the conveyance for inspection may be performed.

Next, a flow of a process for determining whether a cause of an abnormality in the conveyance speed of the general conveying container is on a general conveying container 102 side or on the conveying device 501 side will be described with reference to FIG. 5.

First, when the general conveying container 102 is conveyed by the conveying device 501, the conveyance speed of the general conveying container 102 is obtained based on the position detected by the position detection unit 110 and the time required for conveyance. At this time, when the conveyance speed does not reach the conveyance speed or the conveyance time predicted as indicated by the solid line 303 described with reference to FIG. 4, the control unit 111 determines that there is an abnormality in the conveyance (step S401).

Next, the control unit 111 conveys the inspection conveying container 105 in the same path as that of the general conveying container 102 determined to be abnormal, and records the conveyance speed at that time (step S402). The control unit 111 determines whether there is no abnormality in the conveyance speed of the inspection conveying container 105 (step S403). When the control unit 111 determines that there is no abnormality, the process proceeds to step S404, and when the control unit 111 determines that there is an abnormality, the process proceeds to step S406.

When the conveyance speed of the inspection conveying container 105 is within the area 302 in FIG. 4 in step S403, the control unit 111 can determine that there is no abnormality in the conveyance speed of the inspection conveying container 105. Therefore, the control unit 111 can determine that there is no abnormality on the conveying device 501 side, and it is considered that there is a problem in the general conveying container 102 conveyed earlier. Therefore, the control unit 111 determines that there is an abnormality on the general conveying container 102 side (step S404), notifies, via the display unit 112 or the like, the operator of stop of use of the general conveying container 102 whose conveyance time exceeds the area 302 in FIG. 4 (step S405), and ends the process.

On the other hand, when the conveyance speed of the inspection conveying container 105 deviates from the area 302 in FIG. 4 in step S403, the control unit 111 can determine that there is an abnormality on the conveying device 501 side (step S406), notifies, via the display unit 112 or the like, the operator of stop of use, replacement, or maintenance of the conveying device 501 on a target conveyance path (step S407), and ends the process.

Next, effects of the present embodiment will be described.

The conveying device 501 according to Embodiment 1 of the invention described above includes: the conveying surface 108 that conveys the conveying container 102 provided with a magnetic material thereon; the position detection unit 110 that obtains the position of the conveying container 102 on the conveying surface 108; a plurality of magnetic poles 107 that are disposed below the conveying surface 108 and provided with the cores 106A and the coils 106B; the driving unit 109 that applies a voltage to the magnetic poles 107; and the control unit 111 that controls the driving unit 109. The control unit 111 obtains the general conveyance speed of the conveying container 102 from the position of the conveying container 102 detected by the position detection unit 110 to determine whether the general conveyance speed is abnormal, and when it is determined that the general conveyance speed is abnormal, conveys the inspection conveying container 105 and determines a cause of an abnormality in the general conveyance speed based on a conveyance speed of the inspection conveying container 105.

In order not to stop the sample test, it is required not to determine a normal object to be abnormal, and to immediately handle an object considered to be abnormal. On the other hand, in the conveying device 501 in the related art, when the conveyance speed is abnormal, the abnormality in the conveyance speed of the conveying container is merely notified, whereas according to the invention, since an influence of the weight of the conveyance object can be minimized to the extent that the influence can be ignored, it is possible not only to notify the abnormality in the conveyance speed but also to determine whether a cause of the abnormality in the conveyance speed is on the conveying container 102 side or the conveying device 501 side. Therefore, it is possible to determine various causes of the abnormality in the conveyance speed of the conveying container, which is not possible in the related art, without providing a large number of sensors, and the conveying device 501 can be quickly restored.

The display unit 112 that notifies the operator of various types of information is further provided. When the conveyance speed of the inspection conveying container 105 satisfies the first set reference range, the control unit 111 gives a notification of stop of use of the conveying container 102 for which the abnormality is detected. Therefore, the conveying container 102 which is a cause of the abnormality can be removed from a conveyance operation, and more stable conveyance of the sample can be achieved.

Further, the control unit 111 records a distance that the inspection conveying container 105 is conveyed, and stops using the inspection conveying container 105 when the cumulative conveyance distance is equal to or greater than the threshold value, so that a state of the inspection conveying container 105 can be kept constant, and the cause can be identified with higher accuracy.

By setting the conveyance conditions of the inspection conveying container 105 to be the same as the conveyance conditions of the conveying container 102 when an abnormality is detected, it is possible to further reduce a difference in conditions between the conveyance for inspection and the general conveyance, and it is possible to identify the cause with higher accuracy.

Embodiment 2

A sample conveying device and a sample conveyance method according to Embodiment 2 of the invention will be described with reference to FIGS. 6 and 7. FIG. 6 is an example illustrating a current flowing through a magnetic pole when conveying a sample conveying container in the sample conveying device according to Embodiment 2. FIG. 7 is a flowchart for determining a cause of an abnormality in a conveyance speed of the conveying container.

The conveying device and the sample conveyance method according to the present embodiment determine whether a cause of an abnormality in the conveyance speed of the conveying container 102 is in the magnetic pole 107 on the conveying device 501 side.

FIG. 6 is an example illustrating a current flowing through the magnetic pole 107 when conveying the sample conveying container.

As a cause of a decrease in the conveyance speed of the conveying container, there is deterioration of the magnetic pole 107 on the conveying device 501 side. For example, when a breakage of the coil 106B, a modification of a material of the coil 106B, heat generation due to overcurrent, or winding instability occurs, an electric resistance of the coil 106B increases.

In a case in which the control unit 111 gives instructions to apply a specified voltage from the conveyance speed of the conveying container, when an appropriate current value flows to the magnetic pole 107, a current flows as in a waveform 601 in FIG. 6. However, when the electric resistance increases due to the deterioration of the magnetic pole 107, the current becomes smaller than that in the waveform 601 as indicated by a dotted line 602 in FIG. 6. When the current decreases, an electromagnetic force attracting the conveying container 102 also decreases. Therefore, a thrust of the conveying container 102 decreases, and the conveyance speed decreases.

Therefore, in the present embodiment, the control unit 111 records a current flowing through the coil 106B during conveying the inspection conveying container 105, and when a current value thereof deviates from a second set reference range, the control unit 111 gives a notification of a replacement alarm of the magnetic pole 107.

FIG. 7 is a flowchart for determining whether a cause of an abnormality in the conveyance speed of the conveying container 102 is the deterioration of the magnetic pole 107 on the conveying device 501 side, or other causes.

First, the control unit 111 conveys the inspection conveying container 105, and records a reference current value required to convey the inspection conveying container 105 for inspection by each magnetic pole 107 (step S701). At this time, it is desirable that voltage information instructed to convey the conveying container is also recorded.

It is desirable that this step S701 is performed at a constant frequency regardless of whether an abnormality in the conveyance speed of the general conveying container 102 is detected while the conveying device 501 is being operated. As described in Embodiment 1, a conveyance frequency of the inspection conveying container 105 may be every predetermined time, may be every predetermined number of days, may be when the number of times the conveying container 102 is conveyed to a certain position exceeds the specified number, or may be when the general conveying container 102 has an abnormality in the conveyance.

Subsequent steps S702 to S707 are substantially the same as steps S401 to S406 illustrated in FIG. 5, respectively, and the details thereof are omitted. In step S703, in addition to step S402, the current value during conveyance is recorded.

Next, the control unit 111 compares the reference current value during conveyance of the inspection conveying container 105 recorded in step S701 with the current value required for the conveyance for inspection in step S703. For example, the control unit 111 determines whether a maximum value of the current value in the conveyance for inspection is within ±10% (second set reference range) of a maximum value of the recorded reference current value (step S708).

When determining that a determination condition is satisfied, the control unit 111 determines that there is no abnormality on the magnetic pole 107 side and there is an abnormality on the conveying surface 108 side (step S709). Thereafter, the control unit 111 notifies, via the display unit 112 or the like, the operator of stop of use, replacement, or maintenance of the conveying surface 108 of the conveying device 501 constituting the target conveyance path (step S710), and ends the process.

On the other hand, when determining that the determination condition is not satisfied, the control unit 111 determines that there is an abnormality on the magnetic pole 107 side (step S711), notifies, via the display unit 112 or the like, the operator of stop of use of the target magnetic pole 107 and replacement of the magnetic pole 107 (step S712), and ends the process.

Other configurations and operations are substantially the same as configurations and operations of the sample conveying device and the sample conveyance method according to Embodiment 1 described above, and the details are omitted.

According to the sample conveying device and the sample conveyance method in Embodiment 2 of the invention, substantially the same effects as those of the sample conveying device and the sample conveyance method according to Embodiment 1 described above can also be attained.

When the current flowing through the coil 106B during conveying the inspection conveying container 105 deviates from the second set reference range, the control unit 111 gives a notification of the replacement alarm of the magnetic pole 107, so that an abnormality in the magnetic pole 107 or the conveying surface 108 can be easily identified, and a recovery operation can be performed more quickly and easily.

Embodiment 3

A sample conveying device and a sample conveyance method according to Embodiment 3 of the invention will be described with reference to FIGS. 8 to 11. FIG. 8 is an example illustrating a change in a conveyance speed of an inspection conveying container in the sample conveying device according to Embodiment 3. FIGS. 9 and 10 are examples in which a maximum conveyance speed of the inspection conveying container is plotted in chronological order. FIG. 11 is a flowchart for determining a cause of an abnormality in a conveyance speed of a conveying container.

The conveying device and the sample conveyance method according to the present embodiment determine whether a cause of an abnormality in a conveyance speed of a conveying container is the deterioration of the conveying surface 108 or dirt on the conveying surface 108.

FIG. 8 is an example illustrating a change in the conveyance speed of the inspection conveying container. When the conveying container is conveyed from a certain position to a certain position, it is considered that a graph of the conveyance speed is a trapezoid 801 or a triangular type 802 illustrated in FIG. 8.

A decrease in the conveyance speed of the conveying container causes the deterioration of the conveying surface 108. For example, an upper surface of the conveying surface 108 that is in direct contact with the conveying container 102 rubs against the conveying container 102 during conveyance, thereby causing surface scratches. Accordingly, since the frictional force increases, the thrust decreases, and the maximum conveyance speed decreases, the graph of the conveyance speed becomes a trapezoid 803A or a triangular type 803B in FIG. 8, and the conveyance takes time.

FIG. 9 is an example of a plot of data in which the maximum conveyance speed of the inspection conveying container is recorded in chronological order and the deterioration of the conveying surface 108 is suspected. As is the case of the general conveying container 102 and the inspection conveying container 105, when the conveying container is conveyed, a peak-shaped graph of the conveyance speed can be obtained as illustrated in FIG. 8.

When a vertex is recorded as the maximum conveyance speed in chronological order, as illustrated in FIG. 9, it is possible to record the maximum conveyance speed approximately the same for each conveyance distance (black dots 901). When the maximum conveyance speed of the inspection conveying container is kept within a certain default area 902, it is considered that the conveying surface 108 does not deteriorate or the deterioration is at a level that can be almost ignored.

On the other hand, when the maximum conveyance speed of the inspection conveying container exceeds the default area, it is considered that the conveying surface 108 deteriorates (white dots 903). This is a determination criterion that overlaps with a vertical axis direction for determining an abnormality in the conveyance speed of the inspection conveying container in the graph of FIG. 4.

FIG. 10 is an example of a plot of data in which the maximum conveyance speed of the inspection conveying container is recorded in chronological order and dirt on the upper surface of the conveying surface 108 is suspected. As illustrated in FIG. 10, when the maximum conveyance speed of the inspection conveying container 105 exceeds the default area 902 and there is a deviation 1002 (diagonal point 1003) of, for example, ±5% or more from a linear approximation straight line 1001 subtracted from the maximum conveyance speed for past 10 times from the recorded maximum conveyance speed, it can be considered that there is a rapid change that is not over time in an upper portion of the conveying surface 108.

As described above, when the conveyance speed of the inspection conveying container 105 satisfies a third set reference range, the control unit 111 according to the present embodiment gives a notification of a maintenance alarm of the conveying surface 108, and when the conveyance speed of the inspection conveying container 105 deviates from the third set reference range, the control unit 111 gives a notification of a replacement alarm of the conveying surface 108.

The third set reference range, which is a criterion, can be obtained from a maximum value of the conveyance speed of the inspection conveying container 105 for a plurality of times in the latest, and can be, for example, within a range of ±5% or more from the linear approximation straight line 1001 subtracted from the maximum conveyance speed for past 10 times.

FIG. 11 is a flowchart for determining whether a cause of an abnormality in the conveyance speed of the conveying container is the deterioration of the conveying surface 108 or dirt on the conveying surface 108 on the conveying device 501 side, or other causes.

In FIG. 11, steps S1101 to S1106 are substantially the same as steps S401 to S406 illustrated in FIG. 5, respectively. In step S1102, it is desirable to record the maximum conveyance speed and the conveyed conveyance path of the inspection conveying container 105.

When the conveyance speed of the inspection conveying container 105 deviates from the area 302 in FIG. 4 in step S1103, the control unit 111 can determine that there is an abnormality on the conveying device 501 side (step S1106), and then the control unit 111 determines whether the maximum conveyance speed of the inspection conveying container 105 has a deviation of, for example, ±5% or more from a linear approximation straight line drawn based on the recorded maximum conveyance speeds of the inspection conveying container 105, for example, ten past maximum conveyance speeds of the inspection conveying container 105 (step S1107).

When the deviation is large, it is considered that there is a rapid change in the upper portion of the conveying surface 108, and the control unit 111 determines that dirt on the conveying surface 108 is the cause of the abnormality in the conveyance speed (step S1108). At this time, the control unit 111 notifies, via the display unit 112 or the like, the operator of stop of use, maintenance, or replacement of the conveying surface 108 of the target conveyance path (step S1109), and ends the process. When the abnormality in the conveyance speed is not eliminated even after the maintenance, the conveying surface 108 is replaced by the service person.

When the deviation of the maximum conveyance speed is within a specified value, it is considered that the conveying surface 108 deteriorates with age or sequentially deteriorates due to use, and the control unit 111 determines that the conveying surface 108 deteriorates (step S1110). At this time, the control unit 111 notifies, via the display unit 112 or the like, the operator of stop of use of the conveying surface 108 of the target conveyance path or the replacement of the target conveying surface 108 (step S1111), and ends the process.

Other configurations and operations are substantially the same as configurations and operations of the sample conveying device and the sample conveyance method according to Embodiment 1 described above, and the details are omitted.

According to the sample conveying device and the sample conveyance method in Embodiment 3 of the invention, substantially the same effects as those of the sample conveying device and the sample conveyance method according to Embodiment 1 described above can also be attained.

When the conveyance speed of the inspection conveying container 105 satisfies the third set reference range, the control unit 111 gives a notification of the maintenance alarm of the conveying surface 108, and when the conveyance speed of the inspection conveying container 105 deviates from the third set reference range, the control unit 111 gives a notification of the replacement alarm of the conveying surface 108. Accordingly, an abnormality caused by the conveying surface 108 can be solved at an early stage, and stable conveyance can be achieved.

Further, by obtaining the third set reference range from the maximum value of the conveyance speed of the inspection conveying container 105 for the plurality of times in the latest, it is possible to determine whether the abnormality in the conveyance speed is caused by a change in a state of the conveying surface 108 with high accuracy.

Embodiment 4

A sample conveying device and a sample conveyance method according to Embodiment 4 of the invention will be described with reference to FIG. 12. FIG. 12 is a flowchart for determining a cause of an abnormality in a conveyance speed in the sample conveying device according to Embodiment 4.

The conveying device and the sample conveyance method according to the present embodiment are obtained by combining Embodiment 2 and Embodiment 3 described above.

FIG. 12 is a flowchart for determining a cause of an abnormality in a conveyance speed of a sample according to the invention including Embodiments 1 to 3.

Steps S1201, S1208, S1214, and S1215 are substantially the same as steps S701, S708, S711, and S712 illustrated in FIG. 7, respectively. Steps S1203 to S1207 are substantially the same as steps S401 to S405 illustrated in FIG. 5, respectively. Steps S1209 to S1213 are substantially the same as steps S1107 to S1111, respectively.

In step S1202, the maximum conveyance speed of the inspection conveying container in step S1201 is recorded. Processes equivalent to steps S1202 and S1201 may be performed before step S1101 in FIG. 11 described above.

Other configurations and operations are substantially the same as configurations and operations of the sample conveying device and the sample conveyance method according to Embodiment 1 described above, and the details are omitted.

According to the sample conveying device and the sample conveyance method in Embodiment 4 of the invention, substantially the same effects as those of the sample conveying device and the sample conveyance method according to Embodiment 1 described above can also be attained.

In the present embodiment, it is determined whether the cause is the general conveying container 102, the abnormality of the magnetic pole 107, dirt on the conveying surface 108, or the deterioration of the conveying surface 108, it is possible to notify whether the cause is in a range that can be handled by the operator or a range that can be handled by the service person.

OTHERS

The invention is not limited to the above embodiments, and includes various modifications. The above embodiments have been described in detail for easy understanding of the invention, and the invention is not necessarily limited to those including all the configurations described above.

A part of a configuration according to one embodiment may be replaced with a configuration according to another embodiment, and a configuration according to one embodiment may also be added with a configuration according to another embodiment. A part of the configuration according to each embodiment may be added to, deleted from, or replaced with another configuration.

REFERENCE SIGNS LIST

101: sample container,
102: conveying container, general conveying container,
103: sample,
104: magnetic material,

16

105: inspection conveying container (reference conveying container),
106A: core,
106B: coil,
107: magnetic pole,
108: conveying surface,
109: driving unit,
110: position detection unit,
111: control unit,
112: display unit (notification unit),
204: position A,
205: position B,
206: position C,
207: position D,
208: position E,
209: position F,
301: solid line showing conveyance speed when conveying general conveying container with no abnormality,
302: area (first set reference range),
303: solid line showing conveyance speed when conveying general conveying container with abnormality,
501: conveying device,
502: analyzing device,
503: control device,
601: waveform,
602: dotted line,
801,803A: trapezoid,
802,803B: triangular type,
901: black dot,
902: default area,
903: white dot,
1000: sample test automation system,
1001: linear approximation straight line,
1002: deviation,
1003: diagonal point

The invention claimed is:

1. A sample conveying device comprising:
a conveying surface that conveys a conveying container provided with a magnetic material thereon;
a position detection unit that obtains a position of the conveying container on the conveying surface;
a plurality of magnetic poles that are disposed below the conveying surface and provided with cores and coils;
a driving unit that applies a voltage to the magnetic poles; and
a control unit that controls the driving unit, wherein
the control unit:
obtains a general conveyance speed of the conveying container from the position of the conveying container detected by the position detection unit to determine whether the general conveyance speed is abnormal; and
upon determining that the general conveyance speed is abnormal, conveys a reference conveying container and determines a cause of an abnormality in the general conveyance speed based on a conveyance speed of the reference conveying container.

2. The sample conveying device according to claim 1, further comprising:
a notification unit that notifies an operator of various information, wherein
when the conveyance speed of the reference conveying container satisfies a first set reference range, the control unit notifies stop of use of the conveying container for which an abnormality is detected.

3. The sample conveying device according to claim 1, further comprising:

a notification unit that notifies an operator of various
  information, wherein
when the current flowing through the coil during convey-
  ing the reference conveying container deviates from a
  second set reference range, the control unit notifies a
  replacement alarm of the magnetic pole.
  4. The sample conveying device according to claim 1,
further comprising:
  a notification unit that notifies an operator of various
    information, wherein
  when the conveyance speed of the reference conveying
    container satisfies a third set reference range, the con-
    trol unit notifies a maintenance alarm of the conveying
    surface.
  5. The sample conveying device according to claim 4,
wherein
  the third set reference range is obtained from a maximum
    value of the conveyance speed of the reference con-
    veying container for a plurality of times in the latest.
  6. The sample conveying device according to claim 1,
further comprising:
  a notification unit that notifies an operator of various
    information, wherein
  when the conveyance speed of the reference conveying
    container deviates from a third set reference range, the
    control unit notifies a replacement alarm of the con-
    veying surface.
  7. The sample conveying device according to claim 1,
wherein
  the control unit records a distance that the reference
    conveying container is conveyed, and stops using the reference conveying container when a cumulative con-
  veyance distance is equal to or greater than a threshold
  value.
  8. The sample conveying device according to claim 1,
wherein
  conveyance conditions of the reference conveying con-
    tainer are the same as conveyance conditions of the
    conveying container when an abnormality is detected.
  9. A sample conveyance method for conveying a sample
contained in a sample container held in a conveying con-
tainer provided with a magnetic material, the method com-
prising:
  when conveying the conveying container by applying a
    voltage to a plurality of magnetic poles provided with
    the cores and coils, which are disposed below convey-
    ing surfaces that conveys the conveying container
    thereon,
  executing a position detection step of obtaining a position
    of the conveying container on the conveying surface;
  executing an abnormality determination step of obtaining
    a general conveyance speed of the conveying container
    from the position of the conveying container detected
    in the position detection step to determine whether the
    general conveyance speed is abnormal;
  upon determining that there is an abnormality in the
    abnormality determination step, executing a reference
    conveyance step of conveying a reference conveying
    container; and
  executing a determination step of determining a cause of
    the abnormality in the general conveyance speed based
    on a conveyance speed of the reference conveying
    container in the reference conveyance step.

* * * * *